US008803677B1

(12) United States Patent
Miller

(10) Patent No.: US 8,803,677 B1
(45) Date of Patent: Aug. 12, 2014

(54) AUTOMOBILE CARBON MONOXIDE DETECTOR

(71) Applicant: Brenda L. Miller, Danforth, IL (US)

(72) Inventor: Brenda L. Miller, Danforth, IL (US)

( * ) Notice: Subject to any disclaimer, the term of this patent is extended or adjusted under 35 U.S.C. 154(b) by 5 days.

(21) Appl. No.: 13/778,346

(22) Filed: Feb. 27, 2013

(51) Int. Cl.
*B60Q 1/00* (2006.01)
*G08B 21/14* (2006.01)

(52) U.S. Cl.
CPC .................................... *G08B 21/14* (2013.01)
USPC ........................................ 340/438; 340/634

(58) Field of Classification Search
USPC ........................................ 340/438, 634, 632
See application file for complete search history.

(56) References Cited

U.S. PATENT DOCUMENTS

| | | | | |
|---|---|---|---|---|
| 3,703,162 | A | 11/1972 | Aono | |
| 3,786,462 | A | 1/1974 | Hayden | |
| 4,345,242 | A | 8/1982 | Ienna-Balistreri | |
| 5,199,397 | A * | 4/1993 | Shelef et al. | 123/198 D |

* cited by examiner

*Primary Examiner* — Shirley Lu
(74) *Attorney, Agent, or Firm* — Crossley Patent Law; Micah C. Gunn

(57) ABSTRACT

An automobile carbon monoxide detector that is removably interconenctable with an automobile cigarette lighter socket, said detector operable thereat to detect and signal the presence of carbon monoxide within an automobile interior by means of a carbon monoxide sensor disposed in operational communication with a microprocesor, said microprocessor causing the illumination of a caution light when the sensor detects the presence of carbon monoxide, said microprocessor then signaling a buzzer to alert occupants of the vehicle that levels of carbon monoxide are approaching dangerous concentrations and that corrective action is emergently requried.

2 Claims, 6 Drawing Sheets

AUTOMOBILE CARBON MONOXIDE DETECTOR

BACKGROUND OF THE INVENTION

Various types of carbon monoxide detectors are known in the prior art. However, what is needed is an automobile carbon monoxide detector that is expediently and separately installable to an extant automobile interior, there usable to signal to occupants of said automobile the presence of carbon monoxide and potentially other exhasut gases, and thence alert said occupants of potentially hazardous concentrations of carbon monoxide at between 75 and 100 ppm, so that prudent and expeditious corrective action can be taken.

FIELD OF THE INVENTION

The present invention relates to an automobile carbon monoxide detector, and more particularly, to an automobile carbon monoxide detector that is removably interconenctable with an automobile cigarette lighter socket, said detector operable thereat to detect and signal the presence of carbon monoxide within an automobile interior by means of a carbon monoxide sensor disposed in operational communication with a microprocesor, said microprocessor causing the illumination of a caution light when the sensor detects the presence of carbon monoxide, said microprocessor thence signaling a buzzer to alert occupants of the vehicle that levels of carbon monoxide are approaching dangerous concentrations and that corrective action is emergently requried.

SUMMARY OF THE INVENTION

The general purpose of the automobile carbon monoxide detector, described subsequently in greater detail, is to provide an automobile carbon monoxide detector which has many novel features that result in an automobile carbon monoxide detector which is not anticipated, rendered obvious, suggested, or even implied by prior art, either alone or in combination thereof.

Carbon monoxide is an odorless, colorless gas potentially fatal to human beings. Since carbon monoxide is produced during internal combustion of carbonaceous fuels, the danger of carbon monoxide poisoning an operator or passenger within an automobile is a ready concern. Carbon monoxide, along with other noxious gases (including, for example, nitrous oxides and carbon dioxide), is typically vented through the vehicle exhaust system. However, an amount of gas may leak into the automobile interior during operation of the automobile—especially, for example, when said automobile is stationary and the engine is running, whereby ambient airflow through the exhaust system is reduced.

This problem may be exacerbated in older vehicles, for example, or other vehicles with an impaired exhaust system. Catalytic converters, for example, over extended periods of use, can warp from incompletely combusted fuels entering the exhaust system and combusting therein. Such warping can weaken seals along the exhaust manifold enabling carbon monoxide and other noxious effluents from combustion to gain access into the closed interior of the automobile in question.

Even at low levels, carbon monoxide has deleterious effects, readily absorbing to hemoglobin in the bloodstream and effectively killing red blood cells to which it attaches. Thus an operator of an automobile having traceable quantities of carbon monoxide within the automobile interior, even at levels deemed below a dangerous threshold, may be significantly impaired while operating the particular automobile. Lightheadedness, dizziness, confusion, flu-like symptoms, and nausea, resultant from a decreased ability to transport oxygen through the bloodstream for gaseous exchange (hypoxia), can lead to the operation of an automobile with ability impaired, and may present an increased danger to the operator of the automobile in question, passengers therein, and other road users.

The present device, therefore, has been devised to detect the presence of carbon monoxide venting into the automobile interior, and thus alert the operator (or passengers, as case may be) of the presence of carbon monoxide within the vehicle interior. The operator, and passengers as case may be, may then take corrective action before exposing themselves to this noxious gas over extended periods.

The preferred embodiment of the present automobile carbon monoxide detector has been devised to separately and conveniently interconnect with an automobile's battery by means of the automobile cigarette lighter socket. Thus a person can acquire said automobile carbon monoxide detector separately, and expediently install said automobile carbon monoxide detector for use, as desired. Alternate embodiments are contemplated, however, for use with automobiles lacking suitable power sockets, wherein the device may be integrated into the automobile electrical system and hardwired in circuit with the automobile battery, as desired.

The present automobile carbon monoxide detector, then, includes a generally trapezoidal sensor body having an anterior face and a rear face separated by a perimeter surface disposed edgewise between the anterior face and the rear face. The anterior face is disposed to outface from the automobile console when the automobile carbon monoxide detector is releasably interconnected with the automobile cigarette lighter socket by means of an automobile power interconnect disposed projecting from the rear face.

In the preferred embodiment disclosed as part of this specification, the automobile power interconnect is configured to releasably insert into the automobile cigarette lighter socket and there connects the automobile carbon monoxide detector in circuit with the automobile's electrical system. However, other embodiments of the device are contemplated wherein the automobile power interconnect consists of simple wiring disposed to connect the device in circuit with a particular vehicle's battery.

A power light is disposed upon the anterior face and illuminates to signal the device is receiving power and is operational when plugged into the automobile cigarette lighter socket or otherwise connected in circuit with the vehicle's electrical system. A user is thus notified that the device is operational and can act in confidence to respond to the presence or absence of carbon monoxide according to the dictates of reason.

A carbon monoxide sensor is disposed within the sensor body in circuit with a microprocessor configured to illuminate a caution light upon the anterior face of the sensor body when carbon dioxide is detected within the automobile interior. When the caution light illuminates, carbon monoxide is detected. When the level of carbon monoxide reaches a level potentially harmful to the operator of the automobile, and any passengers riding in the automobile, the microprocessor causes the caution light to flash and a buzzer, disposed in the sensor body with a speaker outfacing the anterior face, sounds to alert all occupants of the automobile that carbon monoxide is at unsafe levels and emergent action is required.

Levels considered harmful to human beings when detected include 100 parts per million (ppm), and a range of 75 ppm to 100 ppm is considered to activate the sounding of the buzzer.

Thus occupants of a vehicle are alerted to the presence of carbon monoxide within the automobile interior, which presence further signals the in-venting of exhaust gases and potentially other harmful substances in the exhaust, and are subsequently warned of dangerous levels of carbon monoxide so that immediate corrective action may be taken.

An embodiment is considered wherein the automobile power interconnect is disposed endwise upon a cable connected to the sensor body. Thus, the sensor body may be disposed at a cable length's distance from the automobile cigarette lighter socket and releasably adhered to an interior surface in the automobile by means of a suction cup disposed upon the rear face of the sensor body. This enables strategic positioning of the device according to the dictates of a particular user's sensibilities within the automobile interior.

Additional warnings are considered as part of this device, such warnings including the caution light flashing at frequencies increasing proportionately to the detection of increasing levels of carbon monoxide. Moreover, it is contemplated that the pitch and volume of the buzzer may alter as concentrations of carbon monoxide are detected at increasing levels approaching 100 ppm.

Thus has been broadly outlined the more important features of the present automobile carbon monoxide detector so that the detailed description thereof that follows may be better understood and in order that the present contribution to the art may be better appreciated.

Objects of the present automobile carbon monoxide detector, along with various novel features that characterize the invention are particularly pointed out in the claims forming a part of this disclosure. For better understanding of the automobile carbon monoxide detector, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
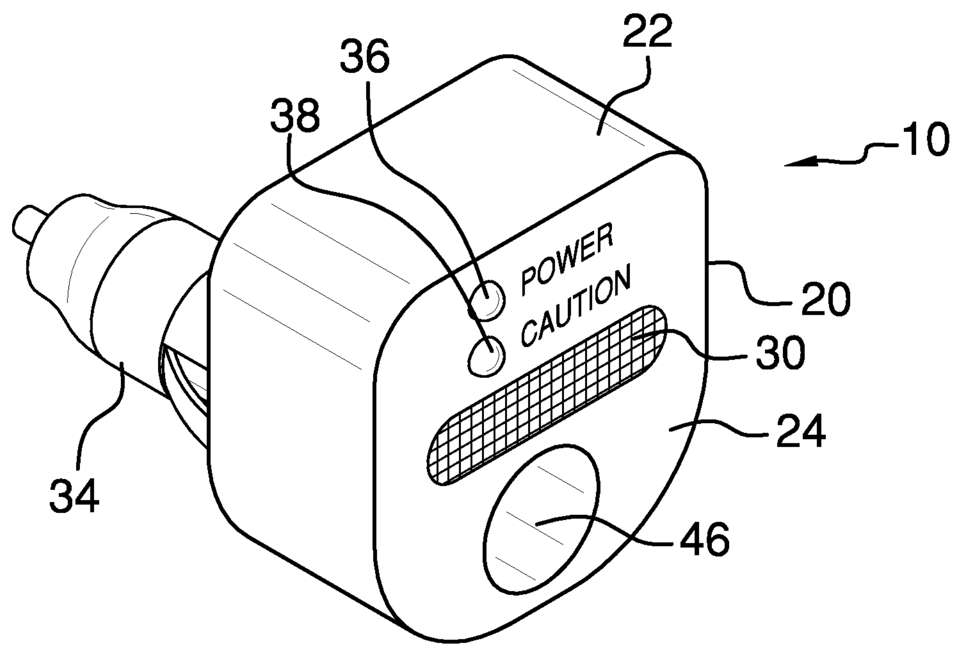
FIG. 1 is an isometric view.
Figure 2:
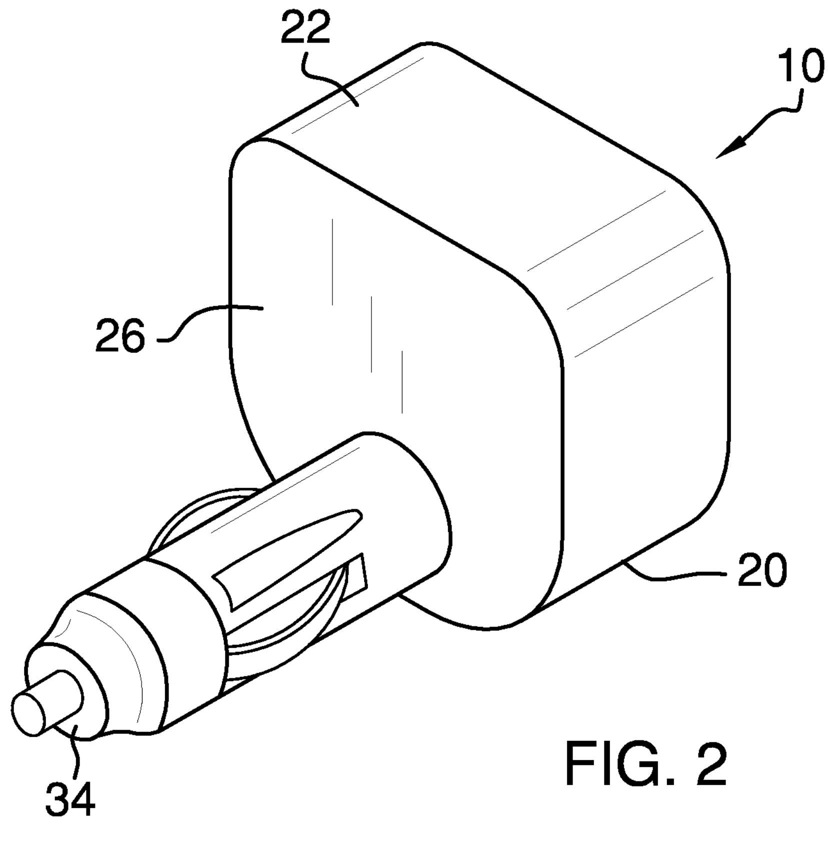
FIG. 2 is an isometric view having a rear orientation.
Figure 3:
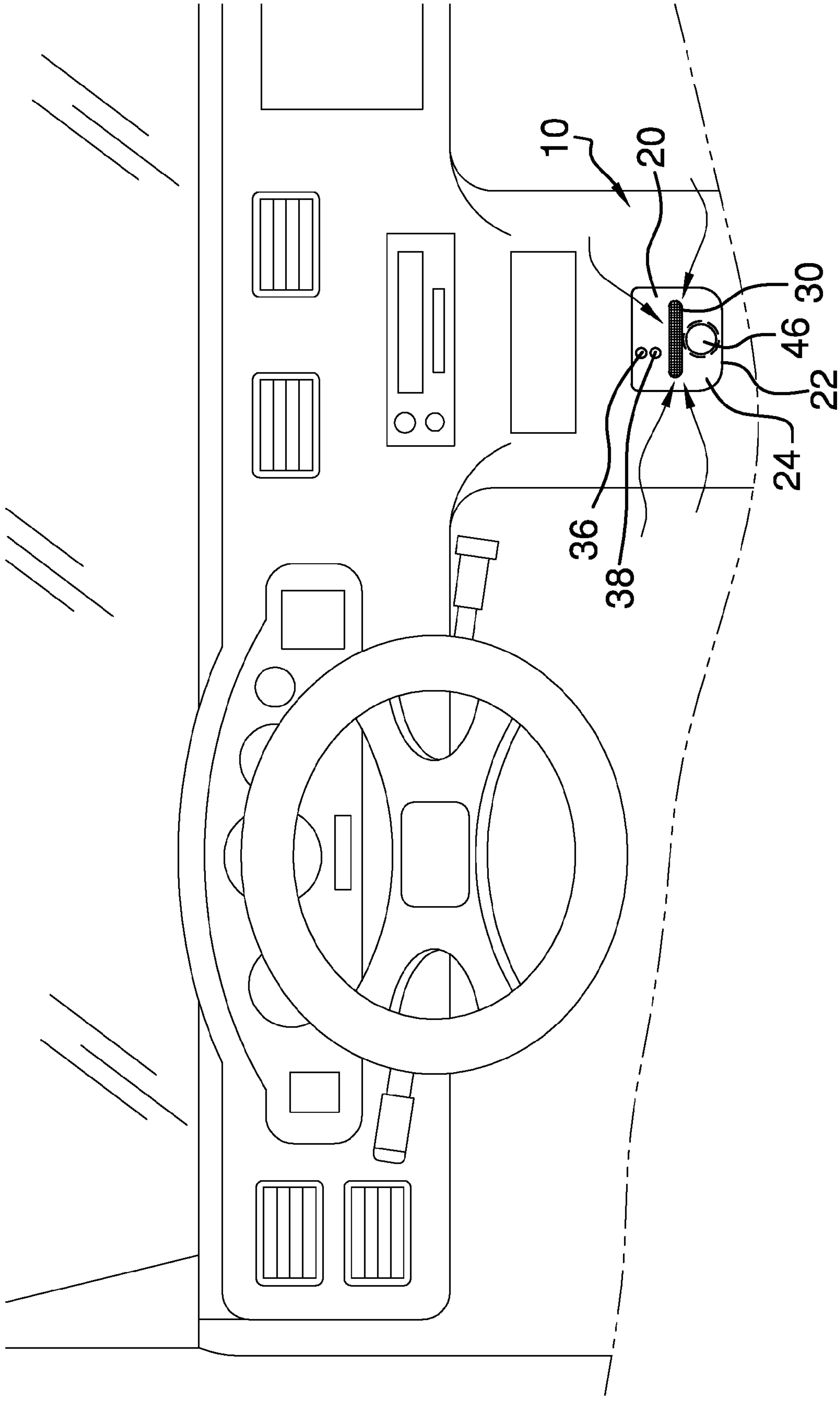
FIG. 3 is an in-use view.

With reference now to the drawings, and in particular FIGS. 1 through 7 thereof, example of the instant automobile carbon monoxide detector employing the principles and concepts of the present automobile carbon monoxide detector and generally designated by the reference number 10 will be described.

Referring to FIGS. 1 through 7 a preferred embodiment of the present automobile carbon monoxide detector 10 is illustrated.

The present device 10 has been devised to be separately installable into an automobile to read levels of carbon monoxide in the automobile interior and, should carbon monoxide be present, indicate detection of the presence of carbon monoxide by means of a caution light 38 and subsequently alert a driver, or other person in the automobile, of unsafe levels of carbon monoxide by means of a buzzer 40. The preferred embodiment herein disclosed is releasably connectable into an automobile cigarette lighter power socket 70.

The present automobile carbon monoxide detector 10 includes a generally trapezoidal sensor body 20. A perimeter surface 22, having rounded corners, is disposed bordering the body 20 edgewise between an anterior face 24 and a rear face 26. A carbon monoxide sensor 28 is disposed within the body 20. A sensing aperture 30 is disposed in the sensor body 20 anterior face 24 through which readings are taken. A microprocessor 32 is disposed in the body 20 in circuit with the carbon monoxide sensor 28, said microprocessor 32 operationally controlling the device 10.

An automobile power interconnect 34 is disposed upon the sensor body 20 rear face 26. In the preferred embodiment herein disclosed, the automobile power interconnect 34 is disposed to interconnect the sensor 28 in circuit with an extant automobile battery 74 when removably plugged into an automobile cigarette lighter socket 70. In order that a user may still utilize the vehicle power supply for additional extant electronic devices when the automobile carbon monoxide detector 10 is in use, a plug receptacle 46 is disposed in the anterior face 24 configured to interconnect additional extant electronics with the automobile power supply.

A power light 36, disposed upon the sensor body 20 anterior face 24 in circuit with the microprocessor 32 and the sensor 28, illuminates to signal a user that the device 10 is receiving power and is operational. A caution light 38 is disposed upon the sensor body 20 anterior face 24 in vertical relation to the power light 36. The caution light 38 is disposed in circuit with the sensor 28 and the microprocessor 32 and illuminates when carbon monoxide is sensed within the automobile interior.

A buzzer 40 is disposed in circuit with the microprocessor 32. When levels of carbon monoxide are sensed at a level potentially dangerous to people within the automobile interior, within a range of 75 to 100 ppm for example, the caution light 38 is caused to flash intermittently and the buzzer 40 is activated to sound an alarm to alert occupants of the automobile of the emergent danger.

Figure 4:
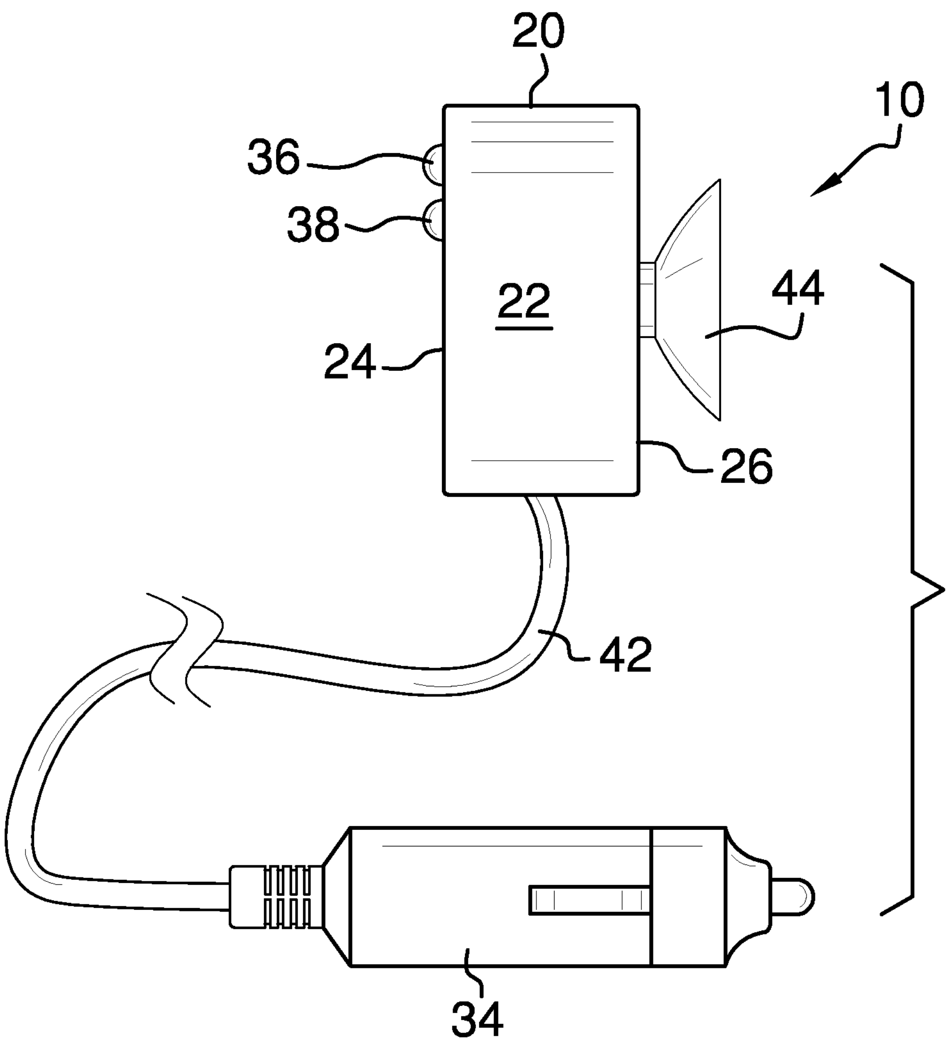
FIG. 4 is a side view of an alternate embodiment.

An alternate embodiment is contemplated in FIG. 4 wherein the automobile power interconnect 34 is disposed endwise upon a cable 42 attached to the sensor body 20. The sensor body 20 is thus positional at a cable length from the extant automobile cigarette lighter socket 70. A suction cup 44, disposed on the rear face 26 of the sensor body 20, enables the sensor body 20 to be releasably attached to an interior surface within the automobile, and there strategically positioned according to the dictates of the sensibilities of any particular user.

Figure 5:
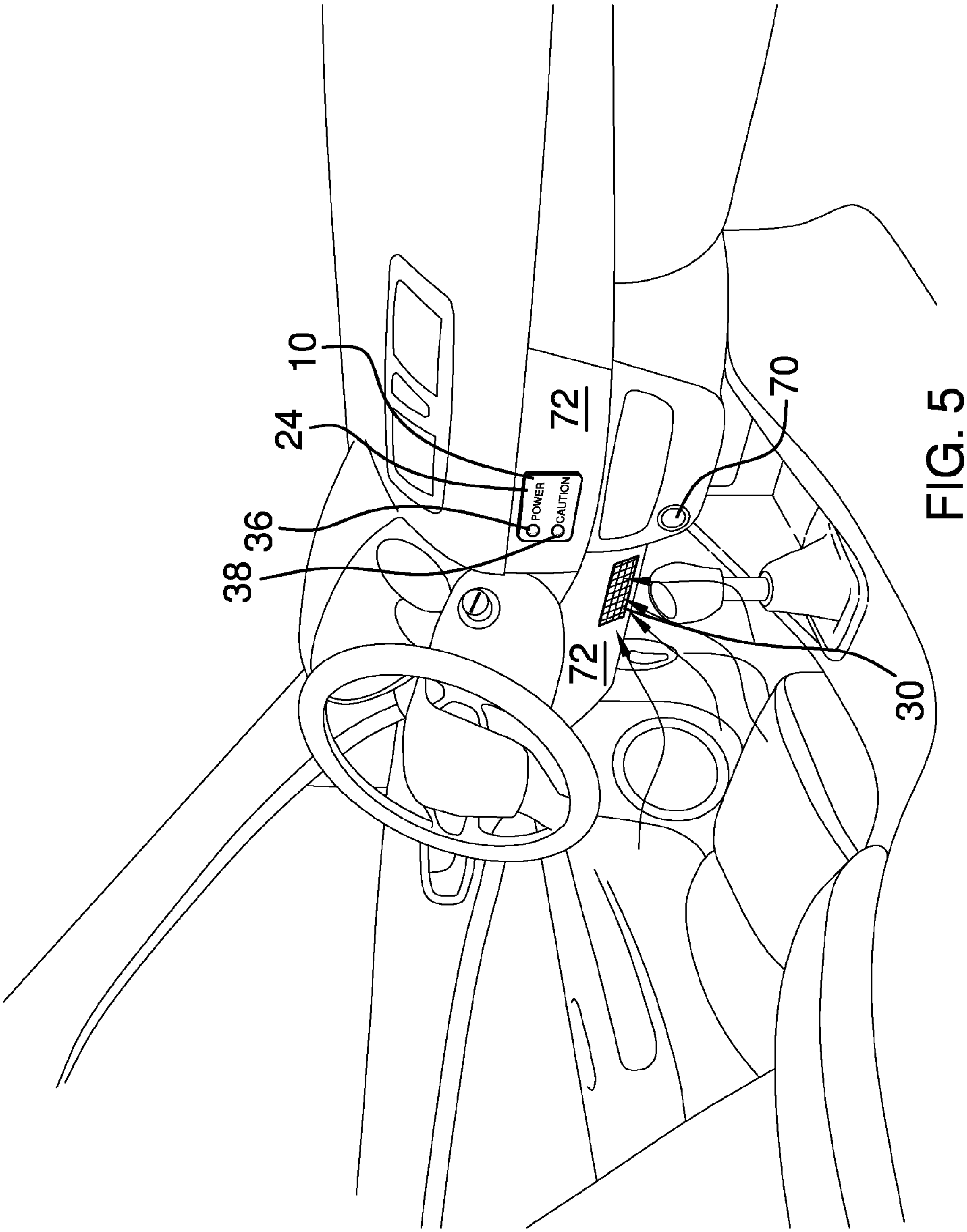
FIG. 5 is an alternate embodiment integrated into an extant automobile.

FIG. 5 illustrates an embodiment wherein the device 10 is integrated into the automobile interior. The sensing aperture 30 is here shown separated from the anterior face 24, and is disposed integrated into the particular automobile dashboard 72. The anterior face 24 of the sensor body 20 is also integrated into the vehicle dashboard 72, but removed from the sensing aperture 30. In this particular embodiment contemplated, the automobile power interconnect 34 is reduced to simple wiring, as the sensor body 20 is integrated into the automobile and thence hardwired into the extant electrical system. Such an installation is envisioned to be a fairly simple procedure usable for automobiles lacking adequate power sockets usable with the previously disclosed embodiment.

Figure 6:
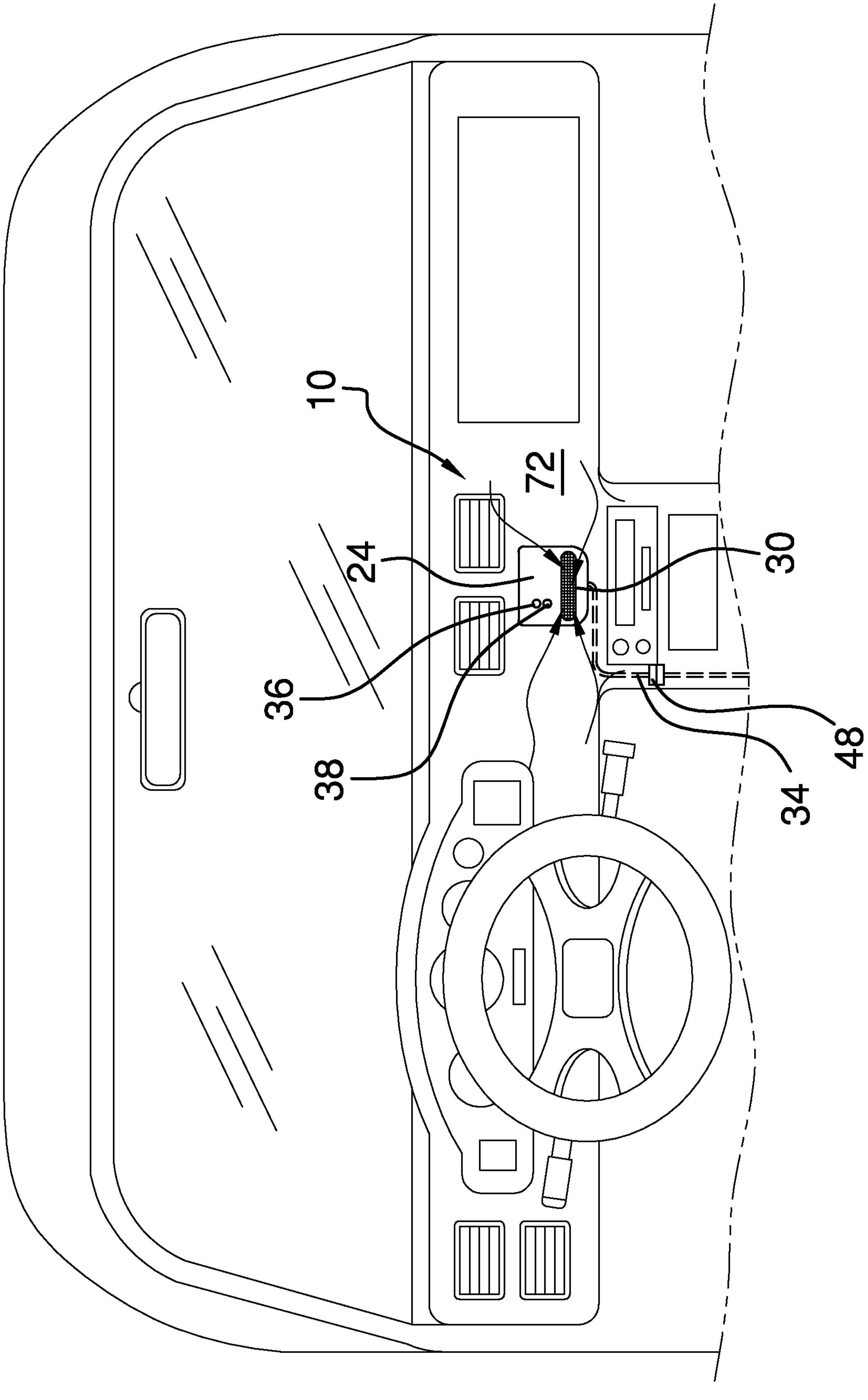
FIG. 6 is an in-use view of the alternate embodiment illustrated in FIG. 4.
Figure 7:
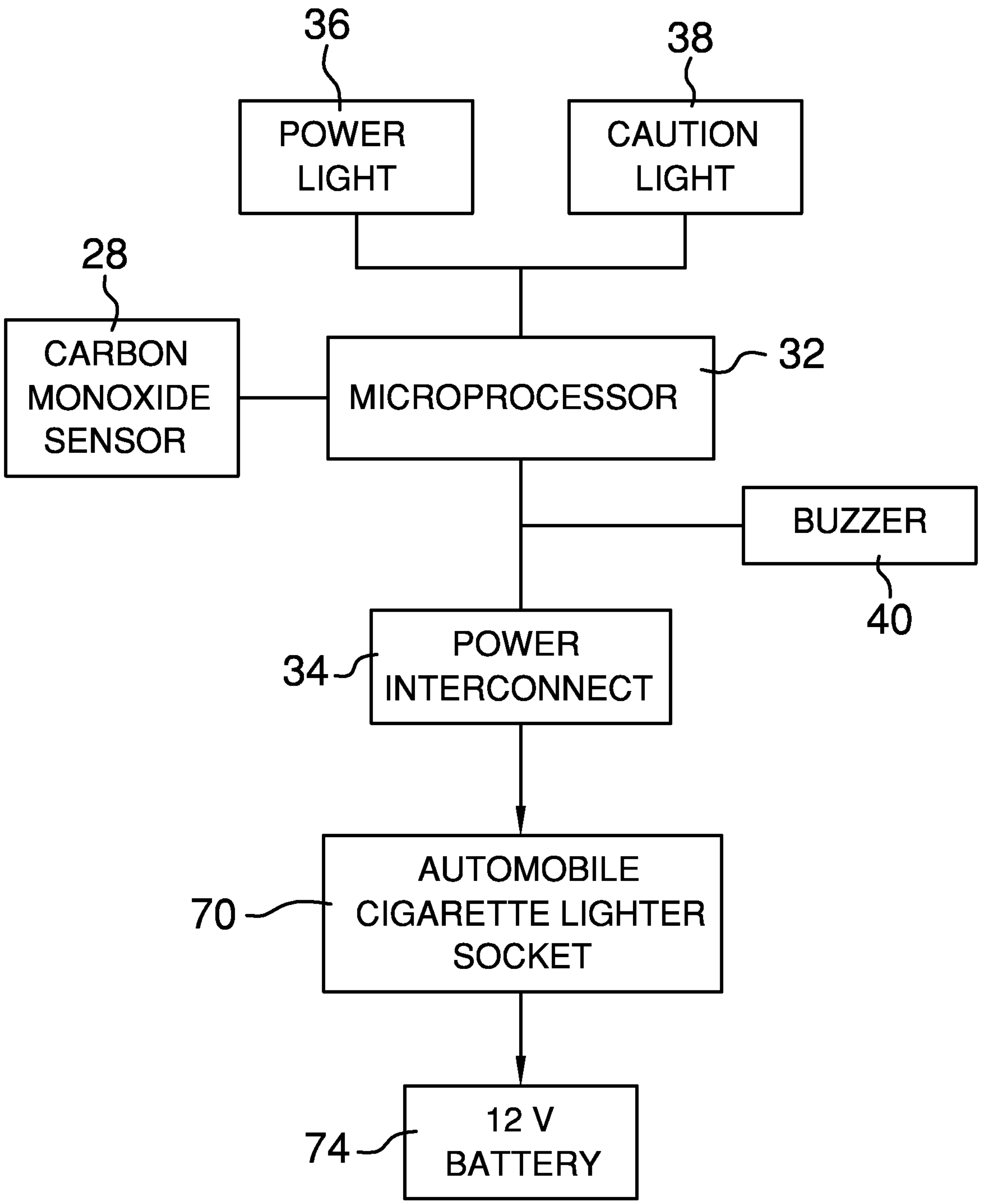
FIG. 7 is a block diagram.

FIG. 6 likewise shows the automobile carbon monoxide detector 10 hardwired into the vehicle electrical system but with the sensing aperture 30 disposed upon the anterior surface of the sensor body 20. This embodiment is contemplated for installation in automobiles lacking cigarette lighter sockets 70, or utilizing other power sockets available for interconnection with extant electronic devices. In this embodiment, the automobile power interconnect 34 is releasably wired into the vehicle's electrical system, and may be detached, as desired, when the plug member 48 is disconnected.

What is claimed is:

1. An automobile carbon monoxide detector comprising:

a generally trapezoidal sensor body including:

a perimeter surface having rounded corners;

an anterior face;

a rear face;

a carbon monoxide sensor disposed within the body;

a sensing aperture disposed in the sensor body anterior face;

a microprocessor disposed in the sensor body in circuit with the carbon monoxide sensor;

an automobile power interconnect disposed upon the sensor body rear face, said automobile power interconnect configured to removably insert into an automobile cigarette lighter socket and interconnect the sensor in circuit with an extant automobile battery;

a power light disposed upon the sensor body anterior face in circuit with the microprocessor and the sensor;

a caution light disposed upon the sensor body anterior face in vertical relation to the power light, said caution light disposed in circuit with the sensor and the microprocessor;

a buzzer disposed in circuit with the microprocessor;

a plug receptacle disposed in the anterior face configured to interconnect additional extant electronics with the automobile cigarette lighter socket while the automobile carbon monoxide detector is in use;

wherein the power light illuminates to signal the sensor is operational when the automobile power interconnect is plugged into an extant automobile cigarette lighter socket and the caution light illuminates when carbon monoxide is detected by the sensor, said caution light flashing and the buzzer activating when carbon monoxide is sensed at levels dangerous to a person within said automobile.

2. An automobile carbon monoxide detector comprising:

a generally trapezoidal sensor body including:

a perimeter surface having rounded corners;

an anterior face;

a rear face;

a carbon monoxide sensor disposed within the body;

a sensing aperture disposed in the sensor body anterior face;

a microprocessor disposed in the sensor body in circuit with the carbon monoxide sensor;

an automobile power interconnect disposed upon the sensor body rear face, said automobile power interconnect configured to removably insert into an automobile cigarette lighter socket and interconnect the sensor in circuit with an extant automobile battery;

a power light disposed upon the sensor body anterior face in circuit with the microprocessor and the sensor;

a caution light disposed upon the sensor body anterior face in vertical relation to the power light, said caution light disposed in circuit with the sensor and the microprocessor;

a buzzer disposed in circuit with the microprocessor;

a plug receptacle disposed in the anterior face configured to interconnect additional extant electronics with the automobile cigarette lighter socket while the automobile carbon monoxide detector is in use;

a suction cup disposed upon the rear face of the sensor body;

wherein the power light illuminates to signal the sensor is operational when the automobile power interconnect is plugged into an extant automobile cigarette lighter socket and the caution light illuminates when carbon monoxide is detected by the sensor, said caution light flashing and the buzzer activating when carbon monoxide is sensed at levels dangerous to a person within said automobile.

* * * * *